Patented July 21, 1953

2,646,406

UNITED STATES PATENT OFFICE 2,646,406

SURFACE ACTIVE COMPOUNDS

William B. Hughes, Bartlesville, Okla., assignor to Cities Service Oil Company, Bartlesville, Okla., a corporation of Delaware No Drawing. Application February 16, 1950, Serial No. 144,595

7 Claims. (Cl. 252—341)

This invention relates to surface active compounds, and more particularly to compounds effective to break water-in-oil emulsions of the type commonly met with in crude oil production.

One of the most troublesome problems met with in crude oil production relates to the breaking of water-in-oil emulsions formed in wells producing both oil and brine. These emulsions are generally of two types, the first type being a mechanically cut emulsion, which is usually formed in the well by fauty pumping equipment, the other type being a gas-cut emulsion, the formation of which is aided by the emulsifying action of certain asphaltenes and other chemical emulsifiers occurring naturally in the crude oil. The emulsion commonly encountered is a mixture of both of these types, and its properties will vary from well to well, and even from day to day in the same well. Unless the emulsions can be effectively and completely broken, the oil content is lost. It is also desirable that the emulsion be broken as rapidly as possible, in order to keep the number and size of the settling tanks to a minimum.

There are apparently two phases of an emulsion resolving problem. The first involves a surface phenomenon in which the oil film surrounding the water particles of micron size is weakened, allowing the particles to coalesce into larger droplets; this phase will hereinafter be referred to as the emulsion breaking step. The other phase involves a splitting of the broken emulsion into separate oil and water phases, and will be referred to as the water separation step.

It will be evident from the foregoing that an emulsion resolving agent must be effective to break both mechanical-cut and gas-cut emulsions with substantially equal facility, must rapidly break the emulsion, and must be effective in causing rapid water separation from the broken emulsion. It has been found in practice that commercially available chemical emulsion breakers, while exhibiting satisfactory emulsion breaking and water separation characteristics on most emulsions, are unsatisfactory on certain other emulsions, since rapid water separation is not obtained, necessitating holding the emulsion in settling tanks for long periods of time in order to effectively separate the water from the oil. Obviously, under such circumstances, it is necessary to provide a much greater number of settling tanks than would be necessary if rapid water separation took place.

It is an object of this invention to provide a composition effective to resolve water-in-oil emulsions of various types.

It is a further object of this invention to provide a composition which when added in small quantities to other chemicals effective to break emulsions but ineffective to cause water separation, will insure a rapid and effective water separation from broken emulsions.

I have found that the product obtained by heat-polymerizing an alkanol amine, and neutralizing the polymer with a hydroxy acid is effective to break a wide variety of emulsions, with complete and rapid water separation. The product is also useful as a water separation agent, from one to ten per cent added to a breaker showing poor water separation characteristics being generally sufficient to give good water separation.

The polymerized amine may be prepared by heating an alkanol amine in the presence of about 1 per cent sodium hydroxide, to a temperature of from about 225° C. to about 275° C. for a time sufficient to polymerize the amine to a heavy syrup or solid. Generally from 8 to 10 hours is sufficient for this step when using triethanolamine, but longer or shorter periods of time may be required when working with other amines. Amines suitable for use in preparing my new compositions may include triethanolamine, tributanolamine, trihexanolamine, trioctanolamine, monethanolamine, diethanolamine, dipropanolamine, dicyclohexanolamine, and the like.

The acid selected as a neutralizing agent for the polymerized amine is apparently the most critical ingredient of the composition. This acid must contain one or more hydroxyl groups, since products obtained by neutralizing with nonhydroxy acids, such as, for example, the product obtained by neutralizing the amine with an alkylated naphthalene sulfonic acid as disclosed by Claytor in U. S. Patent No. 2,309,935, do not possess good water separation characteristics. Thus as a neutralizing agent I may use ricinoleic acid, hydroxy stearic acid, hydroxy acids produced in the controlled oxidation of paraffin wax, hereinafter referred to as hydroxy wax acids, or other long-chain hydroxy acids. The wax acids may be used in a purified state, or may be in the form of crude acids containing up to 20 per cent naphtha, and up to 5 per cent of other oxygenated hydrocarbon compounds, as obtained when separating hydroxy acids from a crude acid mixture according to the process disclosed by Hess in U. S. Patent 2,435,542.

In order that those skilled in the art may more clearly understand the nature of my new compounds and their manner of preparation, the following example is given, merely by way of illustration, and it is to be understood that my invention is not limited to the specific materials or proportions set forth.

Example

A quantity of triethanol amine containing about one per cent by weight of sodium hydroxide was heated at 250° C. for a period of eight hours to polymerize the amine to a heavy syrup. The polymerized amine was then neutralized to a methyl orange end point with hydroxy wax acids. The resultant product was water-insoluble but soluble in hydrocarbons.

When used in proportions of from one part of product to from 400 to 1600 parts of emulsion, compositions prepared as described above were successful in breaking a wide variety of water in crude oil emulsions. They may also be mixed, in order to improve their water separation qualities, with other chemical emulsion breakers such as the breakers disclosed in my copending application Serial No. 131,699 filed December 3, 1949 (now abandoned) and which are prepared by spontaneously reacting two mols of a non-tertiary alkyl, alkanol, or heterocyclic amine with one mol of an aldehyde, separating water of reaction from the reaction product, and neutralizing the reaction product to a methyl orange end point with a propylated naphthalene sulfonic acid prepared according to the directions given in U. S. Patent No. 1,873,165. The aldehyde-amine mixture will react spontaneously with the evolution of heat, and the reaction will normally go to completion within a few hours at ambient temperatures, but it is desirable to heat the reaction mixture to speed the reaction and to insure that it goes to completion. When heated to about 100° C., the reaction is complete in about one half hour. Among the amines found useful in formulating these emulsion breakers are mono- and diethanol amine, mono- and diethyl amine, octyl amine, nonyl amine, hexadecyl amine, octadecyl amine, triethylenetetramine, diacetone amine, N-octyl acetone amine, morpholine, and mixtures thereof. Generally, best results may be obtained by using amines in the $C_8$–$C_{12}$ range. Aldehydes suitable for use in preparing the emulsion breakers may be alkyl, aryl, or heterocyclic, such as formaldehyde, acetaldehyde, furfural, benzaldehyde, heptaldehyde, ethyl hexaldehyde, and nonyl aldehyde.

While emulsion breakers formulated from any of the amines or aldehydes suggested above have been found to have good breaking characteristics, I prefer the breaker formulated by reacting two mols of octylamine with one mol of heptaldehyde, and neutralizing the resultant reaction product with propylated naphthalene sulfonic acid. Another breaker that is almost equal in breaking properties to the foregoing is one formulated by reacting two mols of a mixture of crude alkylamine averaging $C_{12}$ with one mol for formaldehyde, followed by neutralization with propylated naphthalene sulfonic acid. Even when used in quantities of from 1 to 10 per cent of the total breaker mixture, the water separation qualities are remarkably improved. This improvement was also noted when the new composition was added to several commercial breakers, the chemical composition of which is unknown.

Having now described my invention, what I claim as new and useful is:

1. The process of resolving emulsions comprising subjecting a petroleum water-in-oil emulsion to the action of a small but sufficient quantity of a heat-polymerized basic hydroxy mono amine neutralized to a methyl orange end point with a higher molecular weight aliphatic hydroxy acid.

2. The process of resolving emulsions comprising subjecting a petroleum water-in-oil emulsion to the action of a small but sufficient quantity of a basic hydroxy mono amine polymerized to a syrupy consistency by heating at from 225° C. to 275° C. in the presence of a catalytic quantity of sodium hydroxide, and neutralized to a methyl orange end point with a higher molecular weight aliphatic hydroxy acid.

3. The process of resolving emulsions comprising subjecting a petroleum water-in-oil emulsion to the action of a small but sufficient quantity of triethanolamine polymerized to a syrupy consistency by heating at from 225° C. to 275° C. in the presence of a catalytic quantity of sodium hydroxide for a period of from about 8 to about 10 hours, neutralized to a methyl orange end point with a higher molecular weight aliphatic hydroxy acid.

4. The process of resolving emulsions comprising subjecting a petroleum water-in-oil emulsion to the action of a small but sufficient quantity of triethanolamine polymerized by heating at from 225° C. to 275° C. in the presence of a catalytic quantity of sodium hydroxide for a period of from about 8 to about 10 hours, neutralized to a methyl orange end point with hydroxy wax acids.

5. The process of resolving emulsions comprising subjecting a petroleum water-in-oil emulsion to the action of a composition consisting essentially of from about 90 to about 99 per cent of a chemical demulsifier, and from about 1 to about 10 per cent of a heat-polymerized basic hydroxy mono amine neutralized to a methyl orange end point with a higher molecular weight aliphatic hydroxy acid.

6. The process of resolving emulsions comprising subjecting a petroleum water-in-oil emulsion to the action of a composition consisting essentially of from about 90 to about 99 per cent of a chemical demulsifier, and from about 1 to about 10 per cent of triethanolamine polymerized by heating at from about 225° C. to about 275° C. in the presence of a catalytic quantity of sodium hydroxide for a period of from about 8 to about 10 hours, neutralized to a methyl orange end point with a higher molecular weight aliphatic hydroxy acid.

7. The process of resolving emulsions comprising subjecting a petroleum water-in-oil emulsion to the action of a composition consisting essentially of from about 90 to about 99 per cent of a chemical demulsifier, and from about 1 to about 10 per cent of triethanolamine polymerized by heating at from about 225° C. to about 275° C. in the presence of a catalytic quantity of sodium hydroxide for a period of from about 8 to about 10 hours, neutralized to a methyl orange end point with hydroxy wax acids.

WILLIAM B. HUGHES.

References Cited in the file of this patent

UNITED STATES PATENTS

| Number | Name | Date |
|---|---|---|
| 2,023,982 | Stehr | Dec. 10, 1935 |
| 2,034,941 | De Groote et al. | Mar. 24, 1936 |
| 2,231,758 | De Groote et al. | Feb. 11, 1941 |
| 2,246,856 | Monson et al. | June 24, 1941 |
| 2,262,741 | De Groote | Nov. 11, 1941 |
| 2,309,935 | Claytor | Feb. 2, 1943 |
| 2,440,349 | Schaeffer | Apr. 27, 1948 |
| 2,468,181 | De Groote et al. | Apr. 26, 1949 |